United States Patent [19]
Oowaki et al.

[11] Patent Number: 6,026,480
[45] Date of Patent: Feb. 15, 2000

[54] PROCESSOR HAVING BUG AVOIDANCE FUNCTION AND METHOD FOR AVOIDING BUG IN PROCESSOR

[75] Inventors: Yukihito Oowaki, Kanagawa; Hiroshige Fujii; Masatoshi Sekine, both of Tokyo, all of Japan

[73] Assignee: Kabushiki Kaisha Toshiba, Kawasaki, Japan

[21] Appl. No.: 09/037,067

[22] Filed: Mar. 9, 1998

[30] Foreign Application Priority Data

Mar. 10, 1997 [JP] Japan .................................. 9-055042

[51] Int. Cl.[7] ...................................... G06F 9/28
[52] U.S. Cl. ................... 712/37; 712/28; 714/2; 714/10; 714/799; 714/811
[58] Field of Search ................. 395/800.37, 800.28; 714/800, 2, 10, 799, 811; 364/222.2; 712/28, 37

[56] References Cited

U.S. PATENT DOCUMENTS

| | | | |
|---|---|---|---|
| 3,921,141 | 11/1975 | Wilber et al. | 364/222.2 |
| 4,423,594 | 1/1984 | Ellis | 60/39.281 |
| 4,901,320 | 2/1990 | Sawada et al. | 714/800 |
| 5,748,979 | 5/1998 | Trimberger | 395/800.37 |
| 5,784,636 | 7/1998 | Rupp | 395/800.37 |
| 5,852,742 | 12/1998 | Vondran, Jr. et al. | 395/800.28 |

OTHER PUBLICATIONS

Michael Butts, Future Directions of Dynamically Reprogrammable Systems, IEEE Custom Integrated Circuits Conference 1995, p. 487–494, May 1995.

*Primary Examiner*—Meng-Ai T. An
*Assistant Examiner*—Nabil El-Hady
*Attorney, Agent, or Firm*—Oblon, Spivak, McClelland, Maier & Neustadt, P.C.

[57] ABSTRACT

A reconfigurable circuit wherein part or all of an instruction or a result of decoding thereof and output of said register file are inputted and a circuit structure thereof can be changed by an external signal is provided. If a bug occurs when part or all of the instruction or the result of decoding thereof and the output of the register file satisfy a particular condition, the reconfigurable circuit is reconstructed by an external signal so as to output a first signal under that particular condition. An interrupt control circuit controls a processing unit so as to carry out processing based on the first signal or processing to avoid the bug when the first signal is inputted.

6 Claims, 7 Drawing Sheets

PROCESSOR HAVING BUG AVOIDANCE FUNCTION AND METHOD FOR AVOIDING BUG IN PROCESSOR

BACKGROUND OF THE INVENTION

1. Field of the Invention

This invention relates to a processor containing a reconfigurable circuit wherein a circuit structure thereof can be changed according to an external signal and a method for avoiding a bug therein.

2. Description of the Prior Art

In recent years, a style of processing data successively according to processor instructions written by software using a microprocessor has been a main stream in today's information processing apparatuses. The style of using the microprocessor has remarkable advantages in that the function can be changed by changing a software program, a plurality of functions can be achieved by the same hardware and the like. As an importance thereof has increased, the processor is required to carry out processing at further higher speeds.

FIG. 1 is a block diagram showing a structure of major parts of a conventional processor.

In this processor 100, an instruction is inputted through a data bus 101a and stored in an instruction cache 101. If a predetermined instruction is read from this instruction cache 101, it is sent to an instruction decoder 102 through a bus OP and decoded there, so that a control signal is generated in bus CS. Each circuit block and bus in the processor are controlled by this control signal.

Data processing is carried out by arithmetic operation between a register file 103 for storing source data necessary for the operation and function units (FU) 104–106. Data of the register file 103 is supplied to the function units 104–106 through bus RFD and a result of the operation is written back to the register file 103 through the bus 108. Data of the register file 103 is loaded and stored in the data cache 107 and vice versa.

FIG. 2 is a circuit diagram showing an example of a structure of the instruction decoder 102 of FIG. 1.

An instruction array (instruction vector) consisting of two values "0" and "1" sent through the bus OP is inputted to an instruction decoder 102 containing a gate circuit and as a result, various kinds of control signals CS are outputted. As shown in FIG. 2, the various kinds of control signals CS include a RegDst signal, ALUSrc signal, MemtoReg signal, RegWrite signal, MemRead signal, MemWrite signal, Branch signal, ALUOp1 signal, ALUOp2 signal and the like.

Here, the RegDst signal is a control signal for writing back to the register file 103. The ALUSrc signal is a source data control signal to be sent to the function units 104–106. The MemtoReg signal is a control signal for loading from the data cache 107 to the register file 103. The Regwrite signal is a control signal for writing to the register file 103. The MemRead signal is a control signal for reading to the data cache 107. The MemWrite signal is a control signal for writing to the data cache 107. The Branch signal is a control signal for branching. The ALUOp1 signal and ALUOp2 signal are control signals for the function units 104–106.

Higher speed of the microprocessor processing performance of this kind can be attained by only increasing the speed of synchronous clock inputted and increasing the number of instructions to be processed per clock cycle. Here, the latter has been attained by increasing a degree of parallelism of processing in parallel or the number of the function units (FU) which operate in parallel.

Increasing the speed by this method increases the number of the function units and the number of the control circuits, so that this increase of the number of the control circuits makes it very difficult to verify faults (bugs) in design of the microprocessor. Thus, because a complete verification for the processor is impossible in fact, usually latent bugs exist in most processors. Thus, there has been a demand for a skill for avoiding the bug.

In a conventional processor, as evident from FIG. 2, the respective circuits are fixed, so that a particular control signal is always generated to a particular instruction vector. In such a processor, if bugs exist in its function units and it has been made evident that a bug occurs under a particular instruction or particular operating condition, there is no way for avoiding the bug but replacing the processor with a processor containing no bug or determining conditions in software by rewriting all application software. If this is processed by software, there is a possibility that the processing speed may decrease significantly.

In the aforementioned conventional processor, although avoidance of the latent bugs on site can be achieved by rewriting application software for use, this is really impossible if what application software a user will use is not known. That is, according to the prior art, there is no microprocessor capable of identifying and correcting the bugs on site.

SUMMARY OF THE INVENTION

The present invention has been proposed to solve the problems mentioned above. Therefore, an object of the invention is to provide a processor capable of verifying and correcting a bug easily on site and a method for avoiding the bug. Another object of the invention is to provide a processor capable of easily achieving a structure for verification and correction of the bug on site and a method for avoiding the bug. A further object of the invention is to provide a processor easily achieving verification and correction of the bug on site without deteriorating circuit size and circuit speed, and a method for avoiding the bug.

To achieve the above objects, there is provided a processor comprising: an instruction decoder for decoding an instruction to be executed; and a reconfigurable circuit wherein a circuit structure thereof can be changed so as to be capable of outputting a first signal when part or all of the instruction is inputted and part or all of the instruction satisfies a particular condition.

Further to achieve the above object, there is provided a processor comprising: an instruction decoder for detecting an instruction to be executed; a register file for holding source data necessary for executing the instruction; a processing unit for executing the instruction using the source data according to a result of decoding of the instruction decoder and for writing back a result of the execution into the register file as the source data; a reconfigurable circuit wherein a circuit structure thereof can be changed by an external signal so as to be capable of outputting a first signal when part or all of the instruction or a result of decoding thereof and output of the register file are inputted and part or all of the instruction or the result of decoding thereof and the output of the register file satisfy a particular condition; and an interrupt control circuit for controlling the processing unit so as to execute processing based on the first signal when the first signal is inputted.

According to the present invention, when it is made evident that a bug occurs when part or all of an instruction and output of the register file indicates a particular value, the reconfigurable circuit is reconstructed by an external signal so as to output a first signal when the particular value is inputted. Thus, when part or all of the instruction and output of the register file indicates the above particular value (or when a bug occurs), the reconfigurable circuit verifies this so as to output the first signal and according to the first signal, the bug is avoided by, for example, the control of the operating system.

Further, to achieve the above object, there is provided a processor comprising: an instruction decoder for detecting an instruction to be executed; a register file for holding source data necessary for executing the instruction; and a processing unit for executing the instruction using the source data according to a result of decoding of the instruction decoder and for writing back a result of the execution into the register file as the source data, the instruction decoder having a first reconfigurable circuit wherein a circuit configuration thereof can be changed by an external signal so as to be capable of outputting a first control signal when the instruction is a particular instruction, the processing unit having a second reconfigurable circuit wherein a circuit configuration thereof can be changed by the external signal so as to carry out processing based on the particular instruction when the instruction is a particular instruction and further functioning the second reconfigurable circuit when the first control signal is inputted.

According to the present invention, if it is made evident that a bug exists in a circuit for achieving a predetermined function in a processing unit, the first reconfigurable circuit is reconstructed by an external signal so as to output the first control signal when the particular instruction corresponding to the aforementioned predetermined function is inputted, and then the second reconfigurable circuit is reconstructed by the external signal so as to achieve the predetermined function of the processing unit when the first control signal is inputted. As a result, when the particular instruction is executed, the first reconfigurable circuit verifies this particular instruction so as to output the first control signal, and to achieve the aforementioned predetermined function, the second reconfigurable circuit receives the first control signal and achieves a substitutive function of the bug circuit as to avoid the bug.

Still further, to achieve the object above, there is provided a processor comprising: an instruction decoder for detecting an instruction to be executed; a register file for holding source data necessary for executing the instruction; a processing unit for executing the instruction using the source data according to a result of decoding of the instruction decoder and writing back a result of the execution into the register file as the source data, and for having a second reconfigurable circuit wherein a circuit structure thereof can be changed by an external signal so as to carry out processing based on a particular condition when part or all of the instruction or a result of decoding thereof and output of the register file satisfy the particular condition; a first reconfigurable circuit wherein a circuit structure thereof can be changed by the external signal so as to be capable of outputting a first signal when part or all of the instruction or a result of decoding thereof and output of the register are inputted and part or all of the instruction or the result of decoding thereof and the output of the register file satisfy the particular condition; and a data path control circuit for controlling data path so that the source data is inputted to the second reconfigurable circuit when the first signal is inputted.

According to the present invention, if it is made evident that a bug exists in a circuit for achieving a predetermined function in a processing unit, the first reconfigurable circuit is reconstructed by an external signal so as to output the first signal when part or all of the instruction and output of the register file indicate a particular value corresponding to the bug, and then the second reconfigurable circuit is reconstructed by the external signal so as to achieve the predetermined function of the aforementioned processing unit. As a result, when part or all of the instruction and output of the register file indicate the aforementioned particular value (or when a bug occurs), the first reconfigurable circuit verifies this and outputs a first signal, and then according to the first signal, the source data is controlled so as to be inputted to the second reconfigurable circuit. Then the second reconfigurable circuit acts as a substitutive function of the bug circuit so as to avoid the bug.

Still further, to achieve the object above, there is provided a bug avoiding method for a processor comprising: an instruction decoder for detecting an instruction to be executed; a register file for holding source data necessary for executing the instruction; a processing unit for executing the instruction using the source data and for writing back a result of the execution into the register file as the source data, said bug avoiding method comprising the steps of: providing a reconfigurable circuit wherein a circuit structure thereof can be changed by an external signal so as to output a first signal when part or all of the instruction or a result of decoding thereof and output of the register file satisfy a particular condition corresponding to a bug; and controlling the processing unit so as to execute a bug avoiding procedure based on the first signal when the first signal is outputted from the reconfigurable circuit.

The nature, principle and utility of the invention will become more apparent from the following detailed description when read in conjunction with the accompanying drawings.

DETAILED DESCRIPTION OF THE PREFERRED EMBODIMENTS

Figure 3:
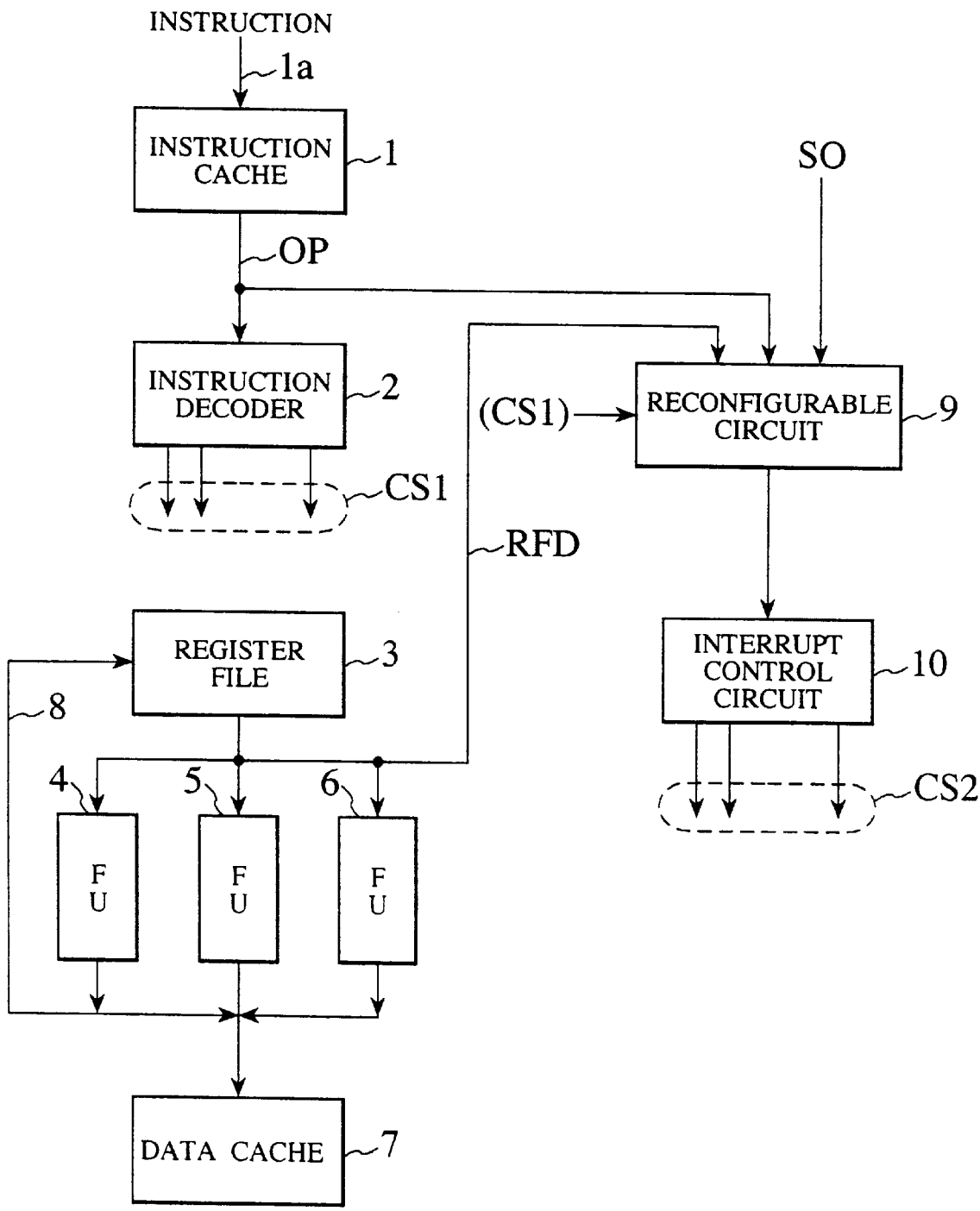
FIG. 3 is a block diagram showing a structure of major components of a processor according to a first embodiment of the present invention.

The embodiments of the present invention will be described with reference to the accompanying drawings. FIG. 3 is a block diagram showing a structure of major parts of a processor according to a first embodiment of the present invention.

Figure 1:
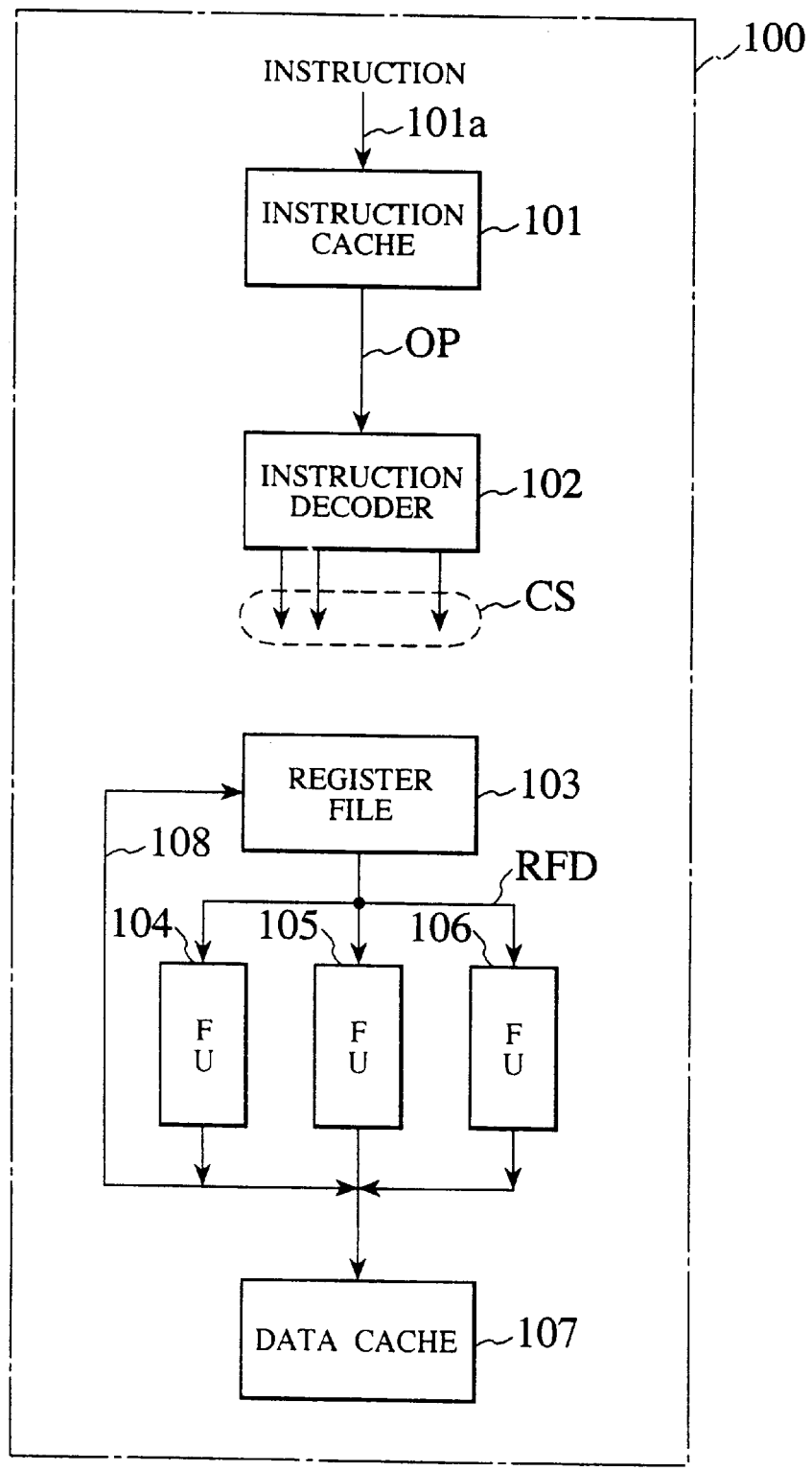
FIG. 1 is a block diagram showing a structure of major components of a conventional processor.

This process contains a reconfigurable circuit 9 and an interrupt control circuit 10 as well as the components of a conventional processor. That is, an instruction cache 1, an instruction decoder 2, a register file 3, function units (FU) 4, 5, 6, a data cache 7 and a data bus 8 in FIG. 3 correspond to respective components 101–108 of the conventional processor shown in FIG. 1. Although not shown, the processor of the present embodiment contains a program counter, an incremental circuit, a memory management unit and the like. The function units 4, 5, 6, data cache 7 and data bus 8 form its processing unit.

The reconfigurable circuit 9 is a circuit whose configuration can be changed according to an external signal SO. At least one of an instruction outputted from the instruction cache 1 to bus OP and executed, data (source data) outputted from the register file 3 to bus RFD and control signal outputted from the instruction decoder 2 to bus CS1 or a combination thereof is inputted to the reconfigurable circuit 9 and this circuit is reconfigured by the external signal SO so that bus hit flag BF is set when these signals satisfy predetermined condition. Then, after receiving the bug hit flag BF, the interrupt control circuit 10 produces a control signal to bus CS2 so as to transfer processing of the processor to the operating system (OS). Then, the operating system is structured to carry out processing for avoiding the bug.

Figure 4:
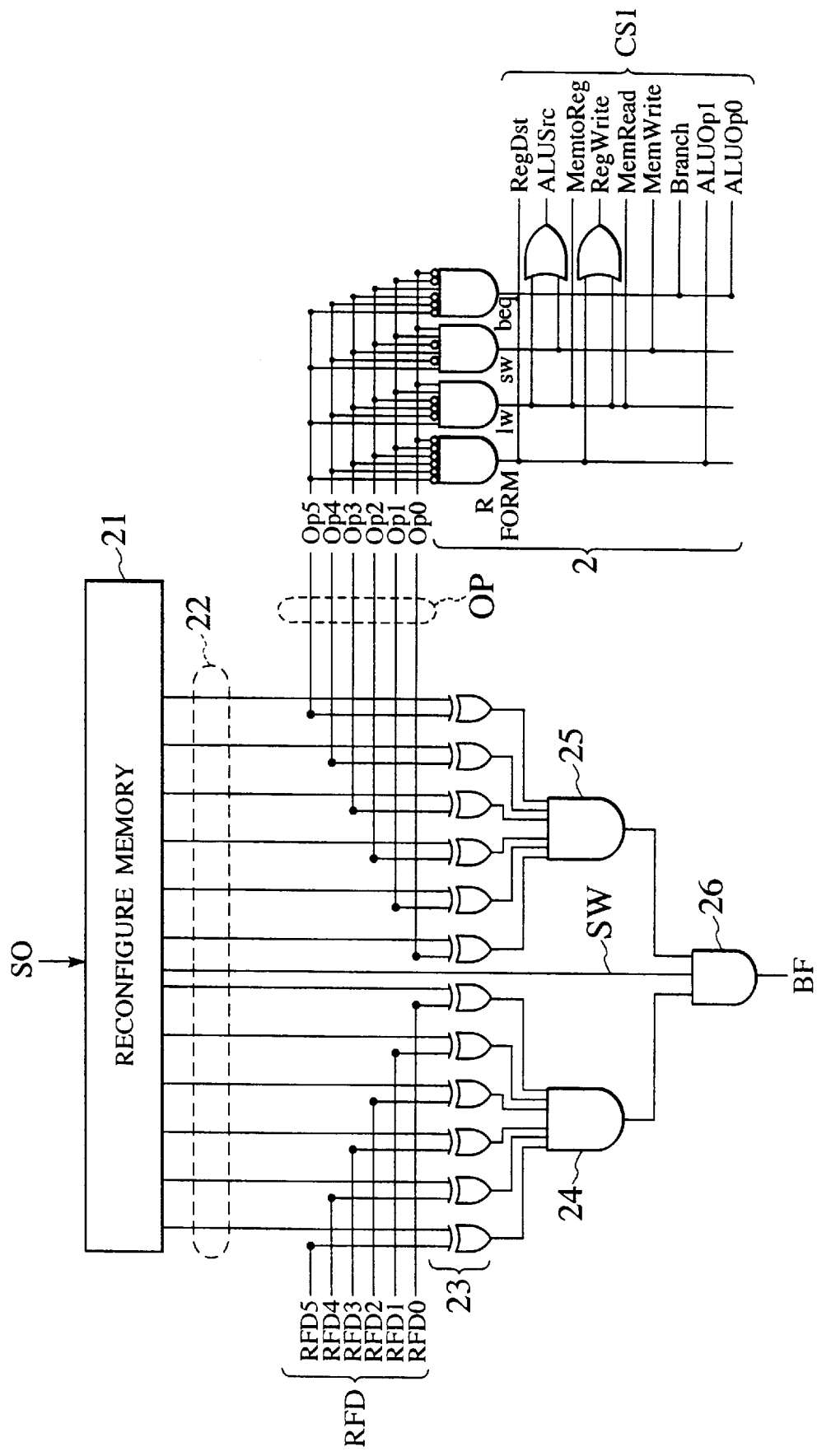
FIG. 4 is a circuit diagram showing an example of structure of a reconfigurable circuit and an instruction decoder.

FIG. 4 is a circuit diagram showing an example of construction of the aforementioned reconfigurable circuit 9 and instruction decoder 2.

Figure 2:
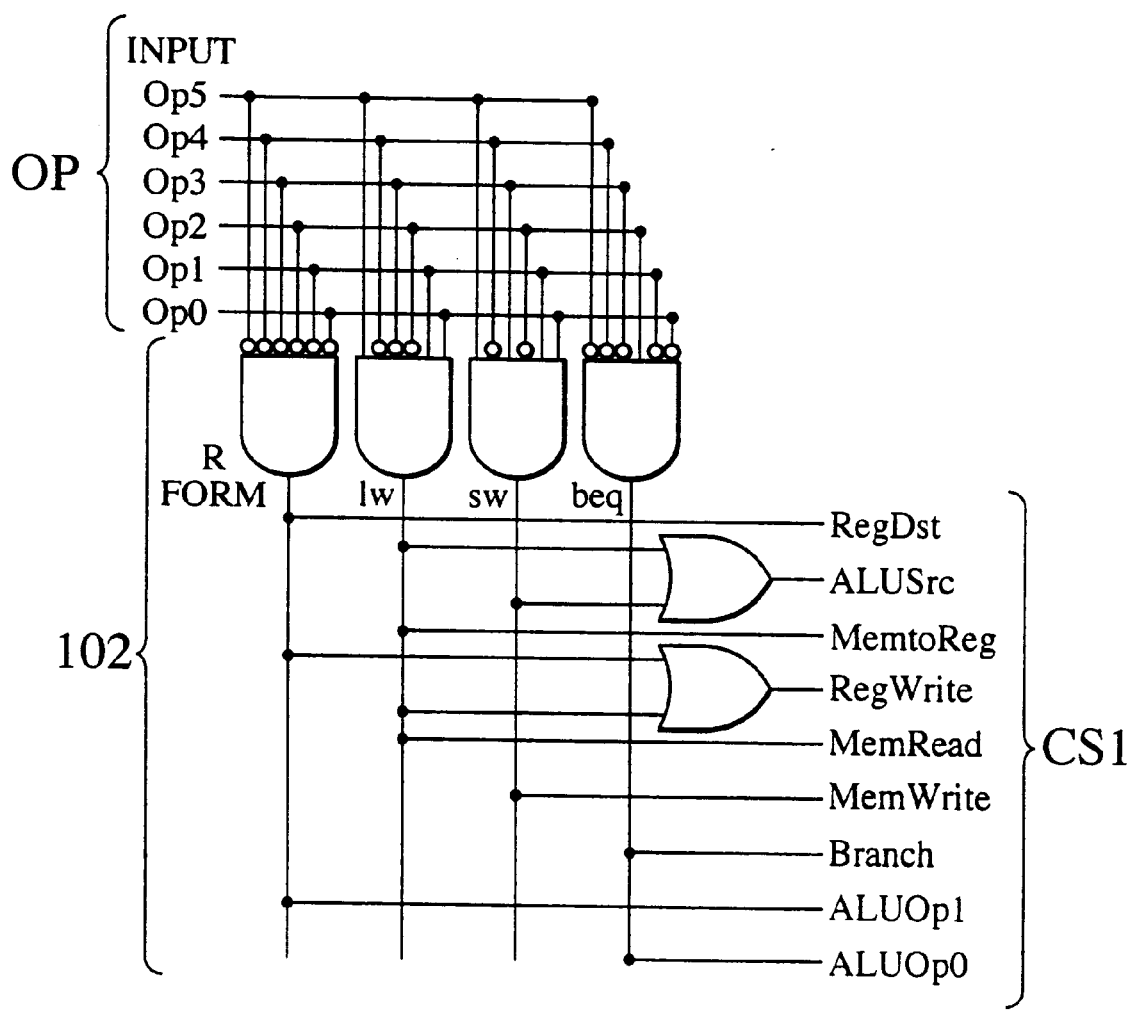
FIG. 2 is a circuit diagram showing an example of structure of an instruction decoder of FIG. 1.

The instruction decoder 2 has the same structure as the conventional instruction decoder shown in FIG. 2. The reconfigurable circuit 9 has a reconfigure memory 21 in which data for reconfiguration is stored. It is preferred to construct this memory 21 with a nonvolatile memory such as EEPROM or the like because data does not have to be loaded each time when the processor is started.

Data stored in the memory 21 is outputted to a signal line 22. Data from the signal line 22 is inputted to a first terminal of each of 2-input EXOR circuits 23. If this data is "1", the EXOR circuit 23 serves as a role of an inverter for another second terminal. If the data is "0", it serves as a role of buffer.

Output sides of the EXOR circuit 23 are connected to AND gate 26 for bug hit flag BF output through AND gates 24, 25. As a result, when output data of the register file 3 and instruction data of the instruction cache 1 become a predetermined input vector according to the content of the reconfigure memory 21, the bug hit flag BF can be set.

The signal line SW serves as a switch for determining whether or not this reconfigurable circuit 9 will be used. Thus, if data for outputting "0" to this signal line SW is stored in the memory 21, even if any data or instruction is inputted from the register file 3 or instruction cache 1, no bug hit flag BF is set, so that this processor executes the same operation as the conventional processor.

Next, actions (A), (B) according to the first embodiment will be described.
(A) Normal Action A desired instruction is inputted from data bus 1a and stored in the instruction cache 1. An instruction address read from a program counter is incremented by an incremental circuit and the instruction address is sent to the instruction cache 1 and memory management unit.

If an instruction stored in that instruction address exists in the instruction cache 1, or simply the instruction cache 1 hits, the instruction in that address is read and sent to the instruction decoder 2. Unless the instruction cache 1 does not hit, reading of the instruction from external memory is required, and therefore that external memory is accessed through a bus interface and the data is read out. The instruction sent to the instruction decoder 2 is converted to an appropriate control signal and outputted to the bus CS1.

Each circuit block and bus are controlled by this control signal. Data processing is carried out by operation between the register file 3 and function units (FU) 4, 5, 6. Data of the register file 3 is supplied to the function units (FU) 4, 5, 6 through the bus RFD.

A result of operation in the function units (FU) 4, 5, 6 is rewritten into the register file 3 through the data bus 8 or used as an address for accessing the data cache 7. The data cache 7 executes load/store for the input access address through the bus 8 in relation with the register file 3. If the data cache 3 makes a mistake, external memory access is carried out through the memory management unit like the instruction cache 1.
(B) Bug Avoiding Action For example if it is made evident that a bug occurs when an instruction outputted from the instruction cache 1 is (0,0,0,0,0,0) and data outputted from the register file 3 is (0,0,0,0,0,0), a user writes data consisting of all "1" in the reconfigure memory 21 as an external signal SO. As a result, only when the above condition arises, the bug hit flag BF is set in the reconfigurable circuit 9. Then the bug hit flag BF enters into the interrupt control circuit 10, so that a control signal is outputted from the interrupt control circuit 10 to the bus CS2. As a result, the operating system carries out control according to that control signal, so as to carry out bug avoiding processing.

As described above, according to this embodiment, if it is made evident that a bug will occur when part or all of an instruction outputted from the instruction cache 1 and data outputted from the register file indicate a particular value, a predetermined external signal SO is inputted to the reconfigurable circuit 9 so as to reconstruct the reconfigurable circuit 9 so that the bug hit flag BF is set when the above condition arises. If the bug occurs for this reason, the reconfigurable circuit 9 determines it and outputs the bug hit flag BF. Then, according to an interrupt procedure started by the interrupt control circuit 10, control is assigned to the operating system so as to avoid the bug.

As a result, even when it is made evident that a fault occurs under a particular instruction or operating condition, it is not necessary to replace the processor with one having no bug, or to rewrite all application software as in the prior art, so that the bug can be avoided easily on site.

A second embodiment of the present invention will be described.

Figure 5:
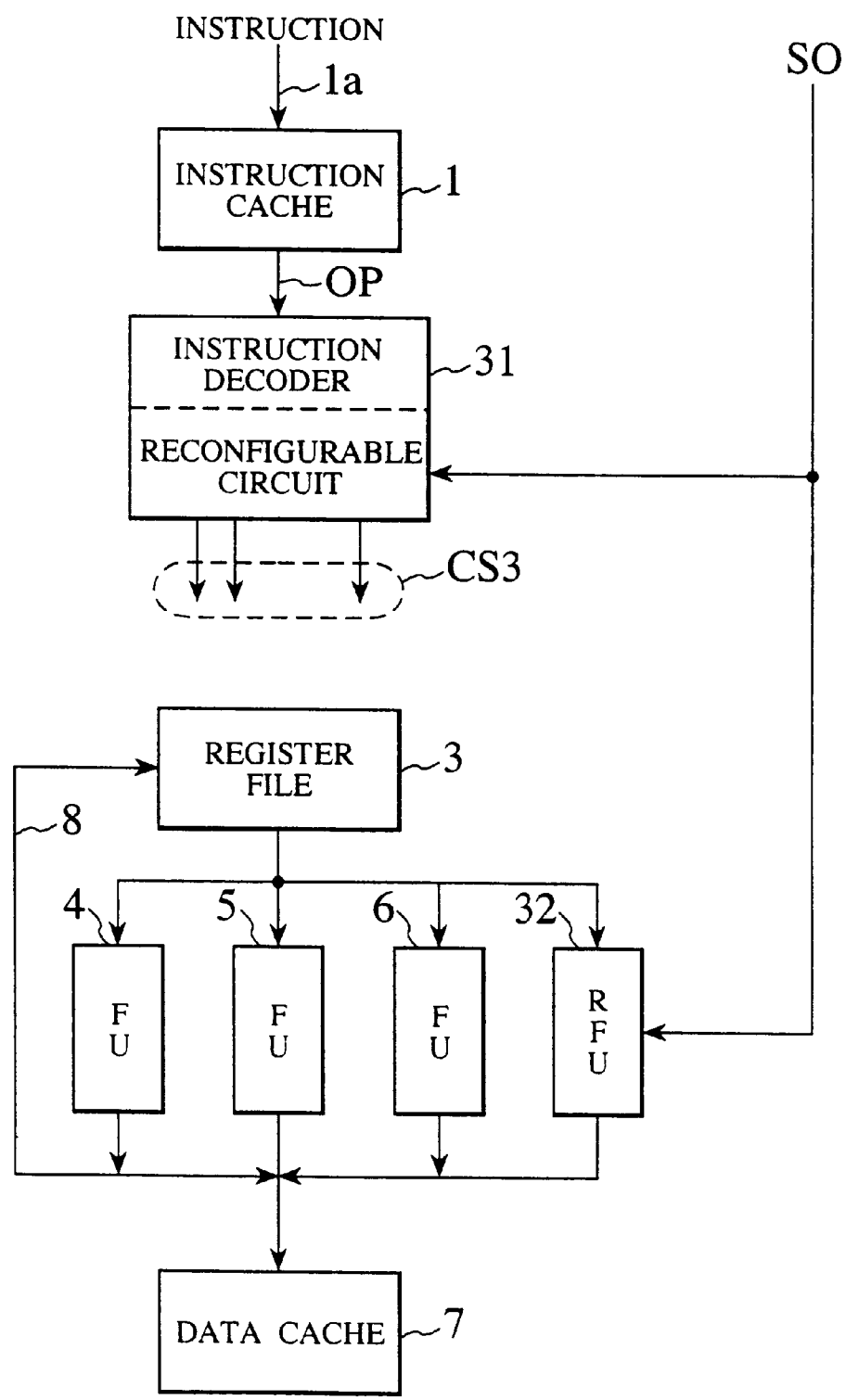
FIG. 5 is a block diagram showing a structure of major components of a processor according to a second embodiment of the present invention.

FIG. 5 is a block diagram showing a structure of major portions of a processor according to a second embodiment of the present invention.

According to the present embodiment, the reconfigurable circuit 9 and interrupt control circuit 10 are removed from the structure of the first embodiment shown in FIG. 3 and an instruction decoder 31 is attached instead of the instruction decoder 2. All or a part of the instruction decoder 31 is a reconfigurable circuit whose circuit structure can be changed by the external signal SO. The processing unit contains a reconfigurable function unit (RFU) 32 constructed of a reconfigurable circuit as well as the function units 4, 5, 6.

Figure 6:
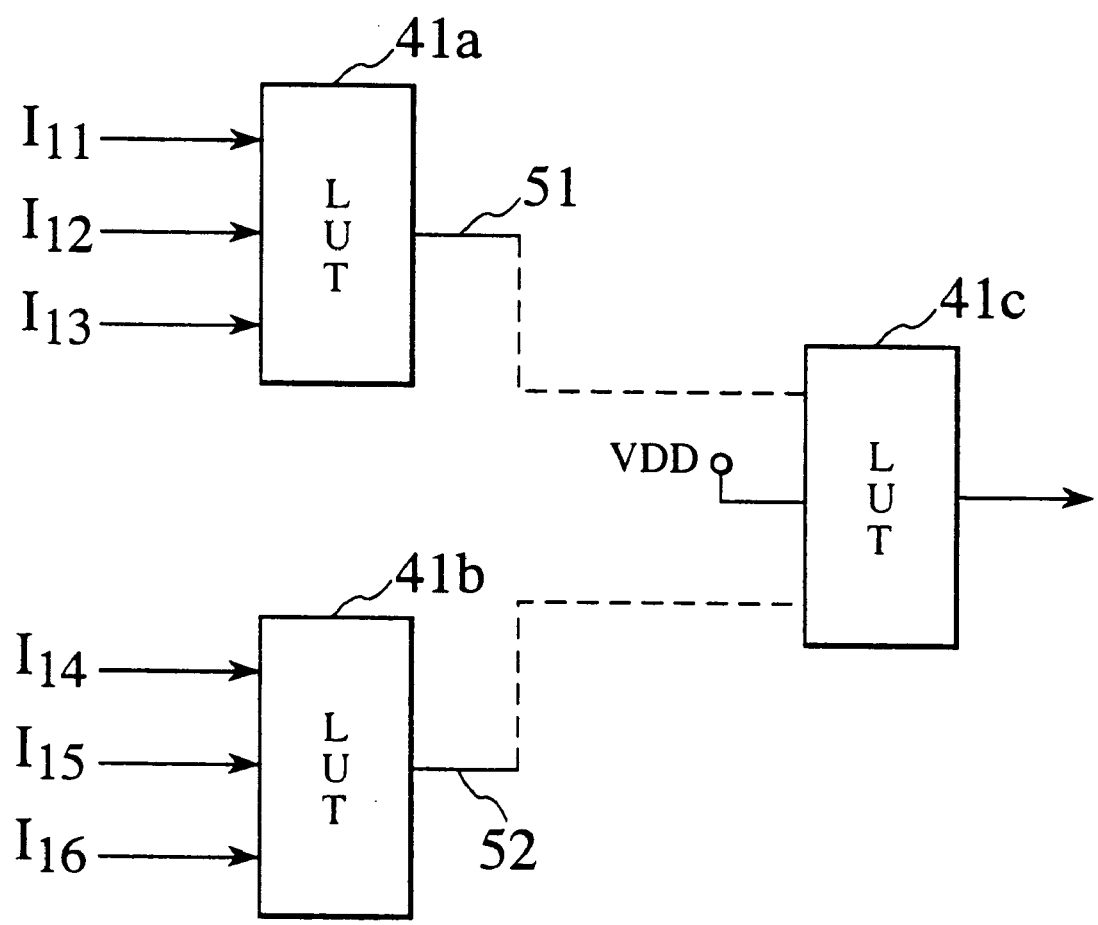
FIG. 6 is an explanatory view for explaining an example of structure of a reconfigurable function unit.

FIG. 6 is a diagram showing an example of structure of the RFU 32.

The RFU 32 is structured by connecting a plurality of 3-input look-up tables (LUT). Each of the 3-input look-up tables 41a, 41b, 41c is composed of EEPROM and so structured that "1" is set only corresponding to a particular combination of three inputs. Here, what an input vector sets to "1" is reconfigurable depending on data to be written into a table. By connecting the plurality of the LUTs, a multiple input circuit is structured. Connecting lines 51, 52 for the multiple connection are programmable.

Next, the operation of the second embodiment will be described.

For example assume that it is made evident that a bug exists in the function unit 4 for achieving a predetermined function (e.g., multiplication) in a processing unit. At this time, the user reconstructs the reconfigurable circuit in the instruction decoder 31 so that a predetermined first control signal is outputted to the bus CS3 when a particular instruction bit string corresponding to the predetermined function is inputted and at the same time, reconstructs the second reconfigurable circuit so that the function of the function unit 4 is achieved when the first control signal is inputted.

As a result, if a particular instruction vector is inputted to the reconfigured instruction decoder 31 through the bus OP, feeding of data to the function unit 4 where the bug is found through the bus RFD is halted by the first control signal and data is processed by the RFU 32 which carries out the same function as the function unit 4 except that the bug is removed by reconfiguration.

That is, to achieve a predetermined function, the RFU 32 receives the first control signal and performs a substitutive function of the function unit 4, so that the bug is avoided.

The present embodiment has an advantage in that because control is not assigned to software when a bug hit occurs, unlike the aforementioned first embodiment, the operating system or the like does not have to be modified. The RFU 32 is not always the same as the function unit 4. If the function unit 4 contains a plurality of functions, there is no problem if only a function having a bug can be executed in the RFU.

A third embodiment will now be described. Although according to the second embodiment, a function unit corresponding to a particular instruction is always rewritten when an instruction is dispatched thereto, in this case, there is a fear that (1) the speed in the RFU32 is slow as compared to an optimally configured FU and (2) the amount of hardware of the RFU 32 increases. Then, according to the third embodiment, skills of the first and second embodiments are combined so as to resolve such a fear.

Figure 7:
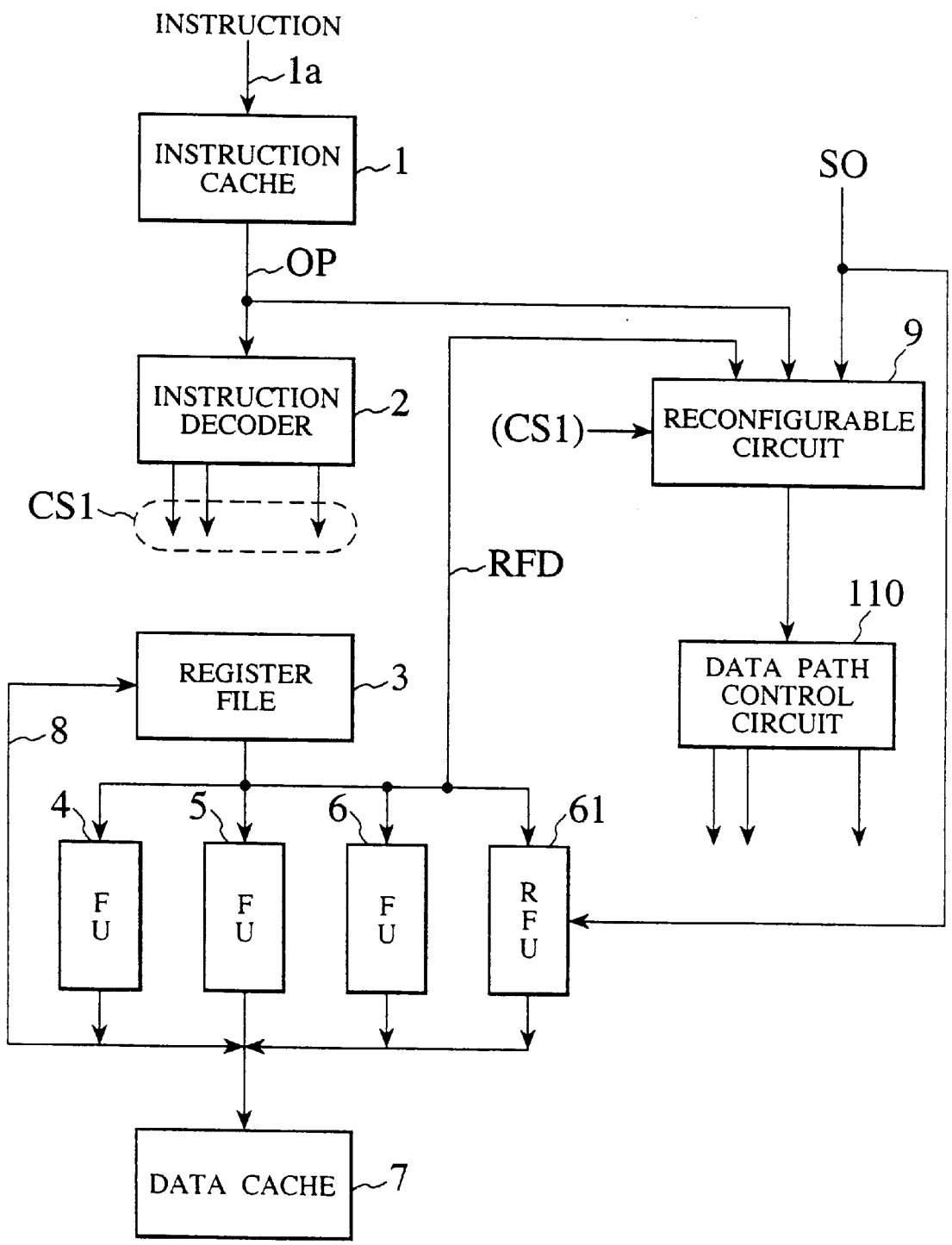
FIG. 7 is a block diagram showing a structure of major components of a processor according to a third embodiment of the present invention.

FIG. 7 is a block diagram showing a structure of major portions of a processor according to the third embodiment.

According to the present embodiment, RFU 61 having a smaller amount of hardware than the RFU 32 is attached to the processing unit of the first embodiment.

For example if it is evident that a bug exists in the function unit 4 for achieving a predetermined function in the processing unit, the reconfigurable circuit 9 is reconstructed so that a bug hit flag BF is outputted when part or all of the instruction and output data of the register file 3 indicate a particular value corresponding to the bug, and at the same time, the RFU 61 is so reconstructed that the predetermined function is achieved when the bug hit flag BF is outputted. Because according to the present embodiment, data flow is changed from a FU where the bug exists to the RFU where the bug is corrected, the interrupt style is not used but data path control is executed so as to achieve the purpose. Further, it is preferred that part or all of data path control circuit 110 is a reconfigurable circuit. Although it has been said that the signal composing the reconfigurable circuit is sent from outside in the present embodiment, according to actual procedure, a signal originating from operation inside a chip or called from a memory inside the chip or a signal originating from a result of operation with these signals may be used as that signal.

Like the aforementioned first embodiment, the bug hit flag BF is set according to a condition between an instruction and data of the register file 3, and only at that time, the data is processed not by the FU 4 where the bug exists but by the RFU 61, so that the bug can be avoided.

It should be understood that many modifications and adaptations of the invention will become apparent to those skilled in the art and it is intended to encompass such obvious modifications and changes in the scope of the claims appended hereto.

What is claimed is:

1. A processor comprising:

an instruction decoder for detecting an instruction to be executed;

a register file for holding source data necessary for executing said instruction;

a processing unit for executing said instruction using said source data according to a result of decoding of said instruction decoder and for writing back a result of the execution into said register file as said source data;

a reconfigurable circuit configured to input at least one of code data of an instruction and a result of decoding thereof, output of said register file and an external signal, and having circuit components therein, wherein connection thereof is changeable in response to said external signal to output a first signal when a particular combination of the at least one of the code data and the result of decoding thereof and output of said register file is inputted; and an interrupt control circuit for controlling said processing unit so as to execute processing based on said first signal when said first signal is inputted.

2. A processor comprising:

an instruction decoder for detecting an instruction to be executed;

a register file for holding source data necessary for executing said instruction; and a processing unit for executing said instruction using said source data according to a result of decoding of said instruction decoder and for writing back a result of the execution into said register file as said source data, said instruction decoder having a first reconfigurable circuit configuration to input an external signal and having circuit components therein, wherein connection thereof is changeable in response to the external signal so as to output a first control signal when said instruction is a particular instruction, said processing unit having a second reconfigurable circuit configured to input said external signal and having circuit components therein, wherein connection thereof is changeable in response to said external signal so as to carry out processing based on said particular instruction when said instruction is said particular instruction and further functioning said second reconfigurable circuit when said first control signal is inputted.

3. A processor comprising:

an instruction decoder for detecting an instruction to be executed;

a register file for holding source data necessary for executing said instruction;

a processing unit for executing said instruction using said source data according to a result of decoding of said instruction decoder and writing back a result of the execution into said register file as said source data, and for having a first reconfigurable circuit configured to input an external signal and having circuit components therein, wherein connection thereof is changeable by said external signal so as to carry out processing based on a particular combination when at least one of said particular combination of the code data and the result of decoding thereof, and output of said register file is inputted;

a second reconfigurable circuit configured to input at least one of code data of an instruction and a result of decoding thereof, output of said register file and said external signal, and having circuit components therein, wherein connection thereof is changeable in response to said external signal so as to output a first signal when a particular combination of at least one of the code data and the result of decoding thereof, and output of said register file is inputted; and a data path control circuit for controlling a data path so that said source data is inputted to said first reconfigurable circuit when said first signal is inputted.

4. A bug avoiding method for a processor comprising:

an instruction decoder for detecting an instruction to be executed;

a register file for holding source data necessary for executing said instruction;

a processing unit for executing said instruction using said source data and for writing back a result of the execution into said register file as said source data, said bug avoiding method comprising the steps of:

providing a reconfigurable circuit configured to input at least one of code data of said instruction and a result of decoding thereof, output of said register file and an external signal, and having circuit components therein, wherein connection thereof is changeable in response to said external signal so as to output a first signal when a particular combination causing a bug of the code data or the result of decoding thereof and output of said register file is inputted; and controlling said processing unit so as to execute a bug avoiding procedure based on said first signal when said first signal is outputted from said reconfigurable circuit.

5. A bug avoiding method for a processor comprising:

an instruction decoder for detecting an instruction to be executed;

a register file for holding source data necessary for executing said instruction;

a processing unit for executing said instruction using said source data and writing back a result of the execution into said register file as said source data, said bug avoiding method comprising the steps of:

forming said instruction decoder with at least a first reconfigurable circuit configured to input an external signal and having circuit components therein, wherein connection thereof is changeable in response to the external signal so as to output a first control signal when said instruction is a particular instruction;

providing said processing unit with a second reconfigurable circuit configured to input said external signal and having circuit components therein, wherein connection thereof is changeable in response to said external signal so as to carry out processing based on said particular instruction when said instruction is said particular instruction; and functioning said second reconfigurable circuit when said first control signal is outputted.

6. A bug avoiding method for a processor comprising:

an instruction decoder for detecting an instruction to be executed;

a register file for holding source data necessary for executing said instruction;

a processing unit for executing said instruction using said source data and for writing back a result of the execution into said register file as said source data, said bug avoiding method comprising the steps of:

providing a first reconfigurable circuit configured to input at least one of code data of an instruction and a result of decoding thereof, output of said register file and an external signal, and having circuit components therein, wherein connection thereof is changeable in response to said external signal so as to output a first signal when a particular combination causing a bug of the code data or the result of decoding thereof and output of said register file is inputted;

providing said processing unit with a second reconfigurable circuit configured to input an external signal and having circuit components therein, wherein connection thereof is changeable by said external signal so as to carry out processing based on said particular combination when said particular combination of at least one of the code data and the result of decoding thereof, and output of said register file is inputted; and controlling a data path so that said source data is inputted to said second reconfigurable circuit when said first signal is outputted.

* * * * *